UNITED STATES PATENT OFFICE.

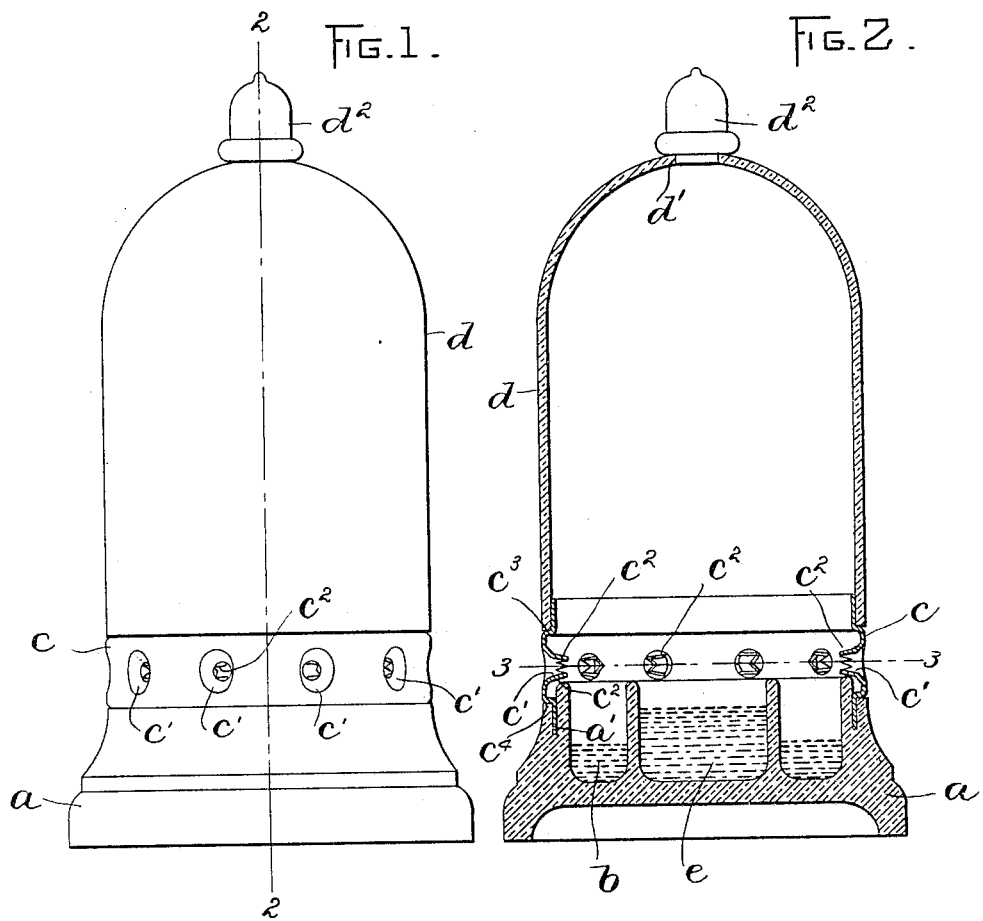

BENJAMIN LENTHIER AND JEAN B. ROUILLIARD, OF BOSTON, MASSACHUSETTS.

FLY-TRAP.

No. 818,836.      Specification of Letters Patent.      Patented April 24, 1906.

Application filed November 17, 1905. Serial No. 287,777.

*To all whom it may concern:*

Be it known that we, BENJAMIN LENTHIER and JEAN B. ROUILLIARD, of Boston, in the county of Suffolk and State of Massachusetts, have invented certain new and useful Improvements in Fly-Traps, of which the following is a specification.

This invention has for its object to provide a simple, durable, and efficient trap for catching flies which shall be neat and ornamental in appearance and free from objectionable features, such as the visible dead bodies of the victims.

The invention consists in the improvements which we will now proceed to describe and claim.

Of the accompanying drawings forming a part of this specification, Figure 1 represents a side elevation of a trap embodying our invention. Fig. 2 represents a section on line 2 2 of Fig. 1. Fig. 3 represents a section on line 3 3 of Fig. 2.

The same reference characters indicate the same parts in all the figures.

In the drawings, $a$ represents a base of any suitable material, preferably opaque glass. Said base is preferably circular and is provided with a reservoir or trough $b$, adapted to contain a bait for attracting flies, a suitable bait being molasses.

$c$ represents an inlet portion supported by and located above the base, the said inlet portion being preferably an annular band or body of sheet metal provided with a plurality of inwardly-projecting frusto-conical inlet-passages $c'$, the inner and smaller ends of which are surrounded by inwardly-projecting spurs or guards $c^2$ of uniform size and shape. The said inlet-passages and guards are preferably integral with the band or inlet portion $c$, the same being formed by pressing portions of said band inwardly. The guards $c^2$ surround an opening of barely sufficient diameter to permit the passage of a fly from without into the interior of the trap, the guards projecting inwardly and being so arranged that they oppose and prevent the return-passage of the fly from the interior of the trap outwardly. The inlet-openings are therefore guarded against the escape of flies from the trap.

$d$ represents an inverted cup, which is preferably of transparent glass and is supported by the inlet portion $c$, the said inlet portion being provided with a shoulder $c^3$ adjacent to its upper edge, on which the lower end or mouth of the cup bears or is seated.

The base $a$ is provided with a groove $a'$, surrounding the bait-reservoir, and the inlet portion $c$ is preferably provided with a lower shoulder $c^4$ adjacent to its lower edge, said shoulder being seated on the outer wall of the groove $a'$, while the lower edge of the inlet portion enters said groove, as shown in Fig. 2. The inner wall of the groove $a'$ is preferably higher than the outer wall, the lower portions of the inlet-passages $c'$ being preferably about flush with the upper edge of said inner wall, so that the said inlet-passages are in close proximity to the bait-reservoir. The base $a$ is preferably provided with an inner reservoir $e$, adapted to contain a suitable insecticide, such as soapsuds, the said inner reservoir being surrounded by the bait-reservoir $b$, which is of annular form.

The reservoir $b$ being charged with bait, flies attracted by it pass through the guarded inlet-passages $c'$ into the interior of the trap. They are prevented from escaping through the inlet-passages by the guards thereof, and such of them as are not at once immersed in the bait or in the contents of the inner reservoir $e$ fly upwardly into the cup $d$, being attracted by the light shining through the transparent wall of the cup. Many of the flies will be deflected back by the wall of the cup into the reservoir $b$ or $e$. The top portion of the cup $d$ has an opening $d'$ closed by a removable stopper $d^2$. When it is desired to dispose of all the flies in the trap, including those that may be in the inverted cup, the stopper may be removed and water poured through the opening $d'$, thus killing all the surviving flies in the trap. The parts of the trap may then be separated and the reservoirs $b$ and $e$ cleaned out, after which the trap may be again adapted for use.

It will be seen that the dead and dying flies in the base of the trap are concealed by the opaque material of the base and of the inlet portion $c$. Hence there is nothing objectionable about the appearance of the trap. Moreover, there is no possibility of the escape of the dead or dying flies from the trap.

In cold weather, when the trap is not required for use, it may be converted into an ornament by removing the inlet portion $c$, allowing the inverted transparent cup to rest directly on the base, and placing artificial flowers or other ornaments in the base, so that they will be visible through the cup.

We claim—

1. A fly-trap comprising a base having a bait-reservoir, an inverted cup above the base, and an intermediate inlet portion.

2. A fly-trap comprising a base having a bait-reservoir, an inverted cup above the base, and an intermediate portion having guarded inlets located between the cup and base.

3. A fly-trap comprising a base having a bait-reservoir, a transparent inverted cup above the base, and an intermediate inlet portion located between the cup and base.

4. A fly-trap comprising an opaque base having a bait-reservoir, a transparent inverted cup above the base, and an opaque intermediate inlet portion located between the cup and base.

5. A fly-trap comprising a base having a bait-reservoir, an inverted cup above the base, and an intermediate sheet-metal portion having inwardly-projecting frusto-conical passages or inlets guarded by prongs or spurs.

6. A fly-trap comprising a base having a bait-reservoir, and a groove surrounding the mouth of the reservoir, an inlet portion having its lower edge formed to enter said groove, the said inlet portion having a shoulder adjacent to its upper edge, and an inverted cup adapted to rest on said shoulder.

7. A fly-trap comprising a base having a grooved bait-reservoir, an inlet portion having a lower shoulder seated on the base at the outer side of the groove, and an upper shoulder adjacent to its upper edge, and an inverted cup adapted to rest on the said upper shoulder.

8. An insect-trap comprising a base having an outer and an inner reservoir, an inverted cup above the base, and an intermediate inlet portion.

9. A fly-trap comprising a base having a bait-reservoir, an inlet portion above the base, and an inverted cup above the inlet portion, said cup having a stoppered orifice in its upper portion.

10. A fly-trap comprising a base having a bait-reservoir, and a groove surrounding the mouth of the reservoir, the inner wall of said groove being higher than the outer wall, an inlet portion seated on the outer wall of the groove, and having guarded inlet-orifices, the lower portions of which are substantially flush with the inner wall of the groove, and an inverted cup seated on the said inlet portion.

In testimony whereof we have affixed our signatures in presence of two witnesses.

BENJAMIN LENTHIER.
JEAN B. ROUILLIARD.

Witnesses:
C. F. BROWN,
E. BATCHELDER.